United States Patent
Abys et al.

(10) Patent No.: US 6,241,870 B1
(45) Date of Patent: Jun. 5, 2001

(54) RHODIUM SULFATE COMPOUNDS AND RHODIUM PLATING

(75) Inventors: Joseph Anthony Abys, Warren; Conor Anthony Dullaghan, Chatham; Peter Epstein, Manalapan; Joseph John Maisano, Jr., Branchburg, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/306,033

(22) Filed: May 6, 1999

(51) Int. Cl.[7] ................................................ C25D 3/50

(52) U.S. Cl. .................................................... 205/264

(58) Field of Search ............................. 205/264; 423/22, 423/23; 23/305 R

(56) References Cited

U.S. PATENT DOCUMENTS

| 4,376,724 | * | 3/1983 | Mita et al. | 502/325 |
| 4,420,420 | * | 12/1983 | Mita et al. | 502/261 |
| 4,789,437 | * | 12/1988 | Sing et al. | 205/76 |
| 4,844,879 | * | 7/1989 | Yamazaki | 423/395 |

OTHER PUBLICATIONS

P. J. Durrant, B. Durrant. Introduction to Advanced Inorganic Chemistry. 2nd edition. 1970, pp. 709 —Month not available—.*

* cited by examiner

Primary Examiner—Kathryn Gorgos
Assistant Examiner—Erica Smith-Hicks

(57) ABSTRACT

The specification describes novel rhodium sulfate complex solutions which have a minimum of metal to metal complexing and are mostly complexed through the sulfate groups. Use of these solutions as electrolytes for plating rhodium results in electroplated layers with improved brightness and reduced stress.

7 Claims, 6 Drawing Sheets

RHODIUM SULFATE COMPOUNDS AND RHODIUM PLATING

FIELD OF THE INVENTION

This invention relates to methods for electroplating rhodium, and to new rhodium compounds and electrolytes for use in electroplating rhodium.

BACKGROUND OF THE INVENTION

Rhodium plated electrodes are used in the soda industry for electrolysis of salt water, and for electrodes for domestic water treatment. Rhodium plating is used widely in the jewelry industry. In the electronics industry, rhodium plating is used for electrical contacts in, e.g., ferreed switches.

It is known that rhodium metal tends to electroplate with high stress. This limits the thickness range over which electroplated layers can be produced without cracking. Moreover, the brightness of conventionally plated rhodium layers declines as the plating thickness increases. Accordingly the thickness of bright rhodium electroplated layers is typically limited to approximately 20 microinches or less. While this thickness may be suitable for some applications, thicker plated layers which retain the brightness of thin layers and are crack free would be desirable for nearly all applications.

STATEMENT OF THE INVENTION

We have developed an electroplating process for rhodium metal which produces relatively low stress electroplated layers that are full bright over a thickness range of 0.1–60 microinches. A feature of the process is the use of a novel rhodium sulfate compound in the electrolyte and the technique for preparing the novel rhodium sulfate compound. In the new rhodium sulfate compound the rhodium sulfate molecules complex with a minimum of metal to metal bonding, with the complex forming predominantly via bridged bidentate sulphato groups. This result is achieved by carefully controlling the hydrolysis of the rhodium sulfate in preparing the electrolyte.

DETAILED DESCRIPTION

Figure 1:
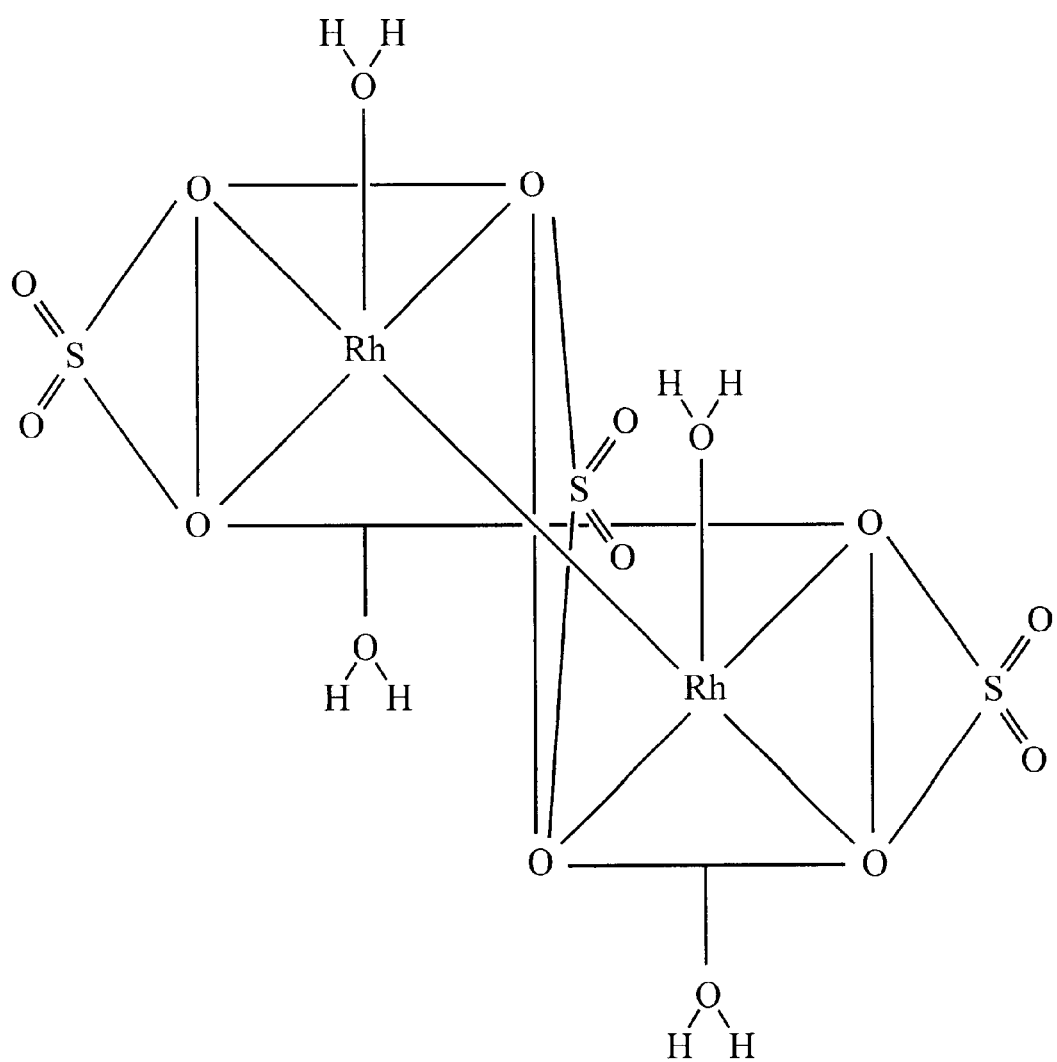
FIG. 1 is a structural diagram of the conventional rhodium sulfate complex.

The rhodium sulfate complex that is formed by standard hydrolysis is shown in FIG. 1. It is characterized by rhodium-rhodium bonding as well as bonding through the sulfate groups. By controlling the hydrolysis reaction, as described below, the rhodium to rhodium bonding is essentially eliminated and the rhodium sulfate complexes as shown in FIG. 2, with a simple bridge between the sulfate groups.

Figure 3:
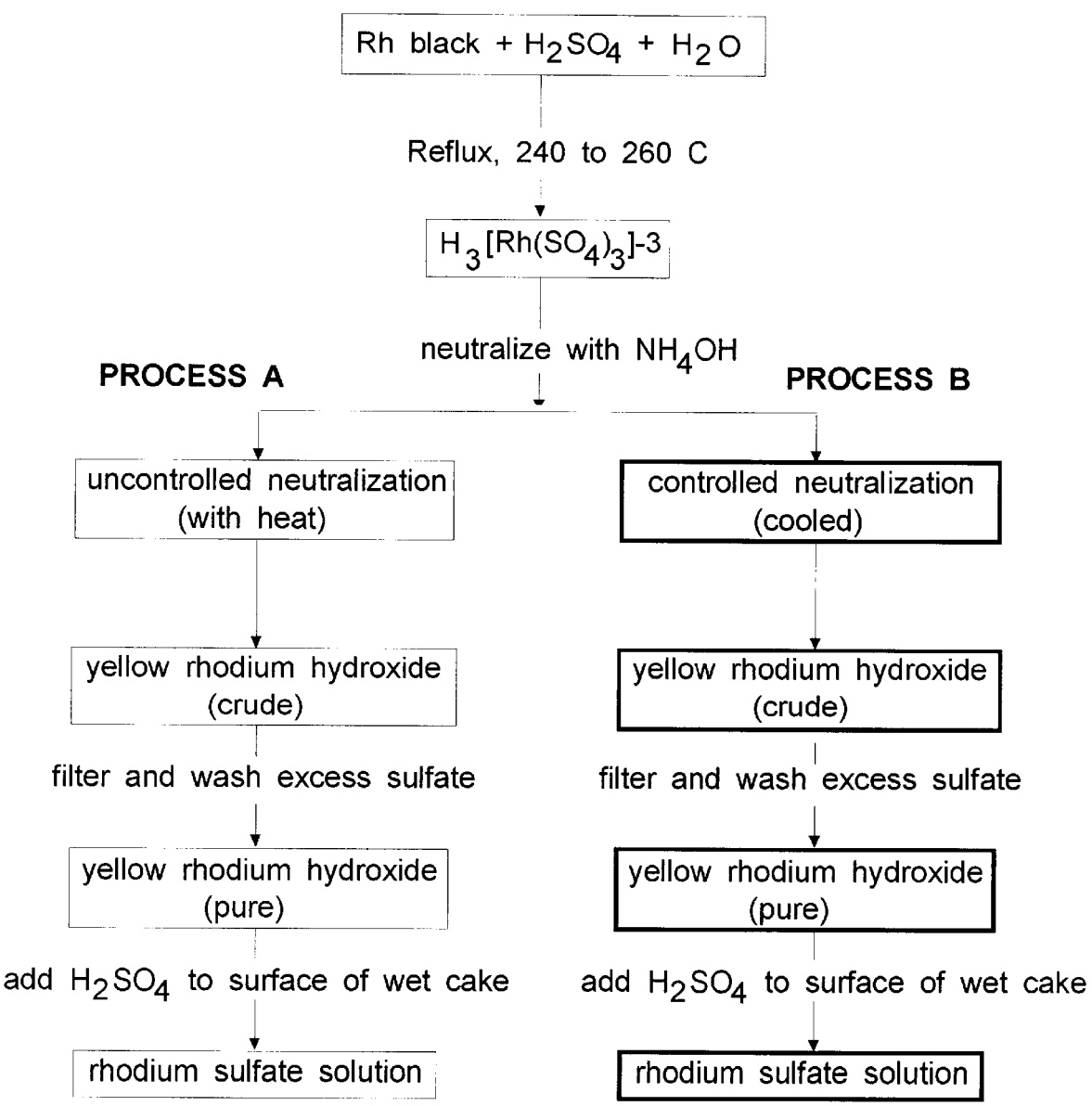
FIG. 3 is a flow diagram comparing the processes for preparing the materials of FIGS. 1 and 2.

The technique for preparing this rhodium sulfate complex is described by the flow chart of FIG. 3. Rhodium is refluxed in sulfuric acid as shown to produce a rhodium sulfate concentrate. The rhodium sulfate is then neutralized with a mild base, in this case, ammonium hydroxide, by the two procedures shown in the figure. The first, Process A, is the conventional hydrolysis in which the acid and base are simply combined, with both reagents typically at room temperature. The neutralization reaction is exothermic, and the solution characteristically heats to a temperature substantially above room temperature. In the process of the invention, Process B, the neutralization reaction is controlled by cooling the rhodium sulfate to a temperature below room temperature, e.g., below 20° C., and maintaining the reagent mixture at a temperature below 25° C. during the reaction. This can be achieved by actively cooling the reaction vessel. In practice, it was found that using a jacketed reaction vessel, and flowing cool or cold water, e.g. water at 10° C., through the vessel jacket, the temperature of the reagent mixture can be controlled to a temperature below 25° C. Without active cooling during the reaction, as described above, the reagent mixture heats to a temperature above 25° C.

The two processes, A and B, are then completed in the same way as indicated, i.e. the yellow rhodium precipitate is filtered and washed, and rhodium sulfate solution, suitable for electrolytic plating, prepared by sulfuric acid addition.

Figure 2:
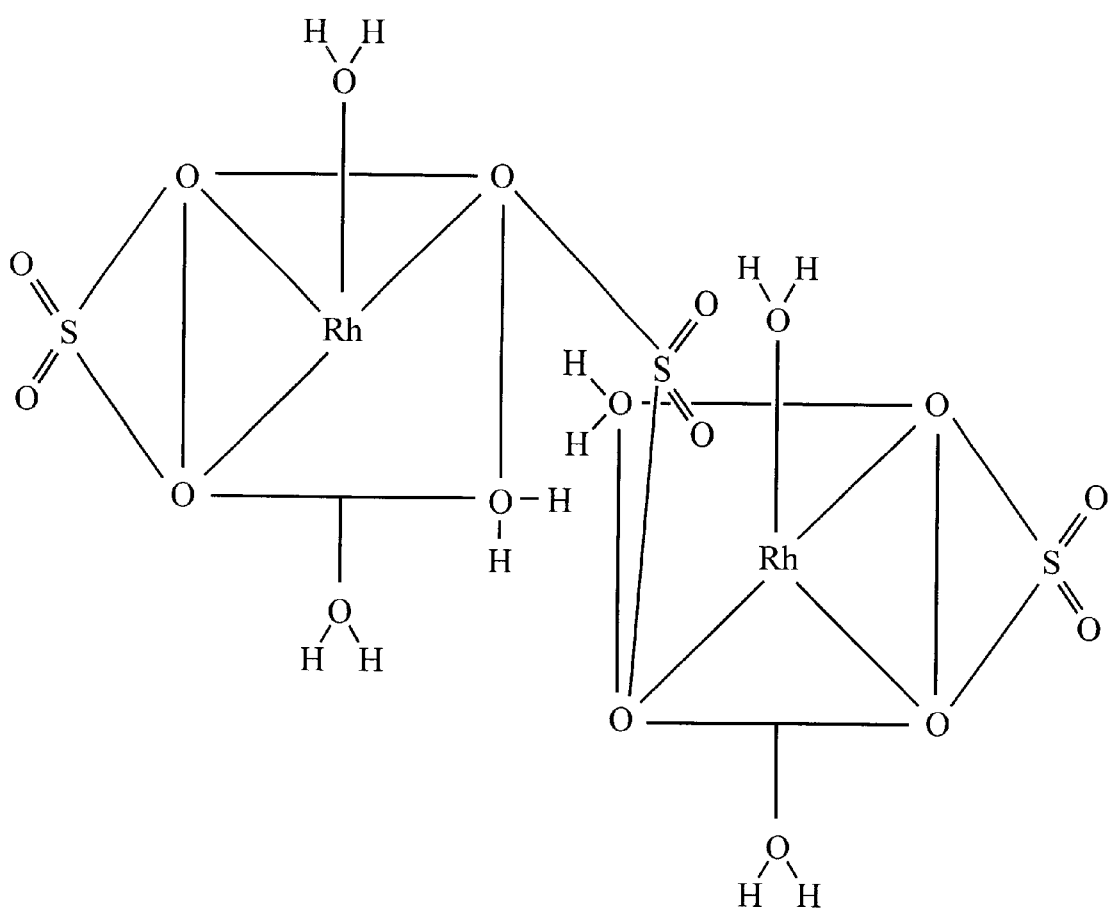
FIG. 2 is a structural diagram of the rhodium sulfate complex prepared by the technique of the invention.
Figure 4:
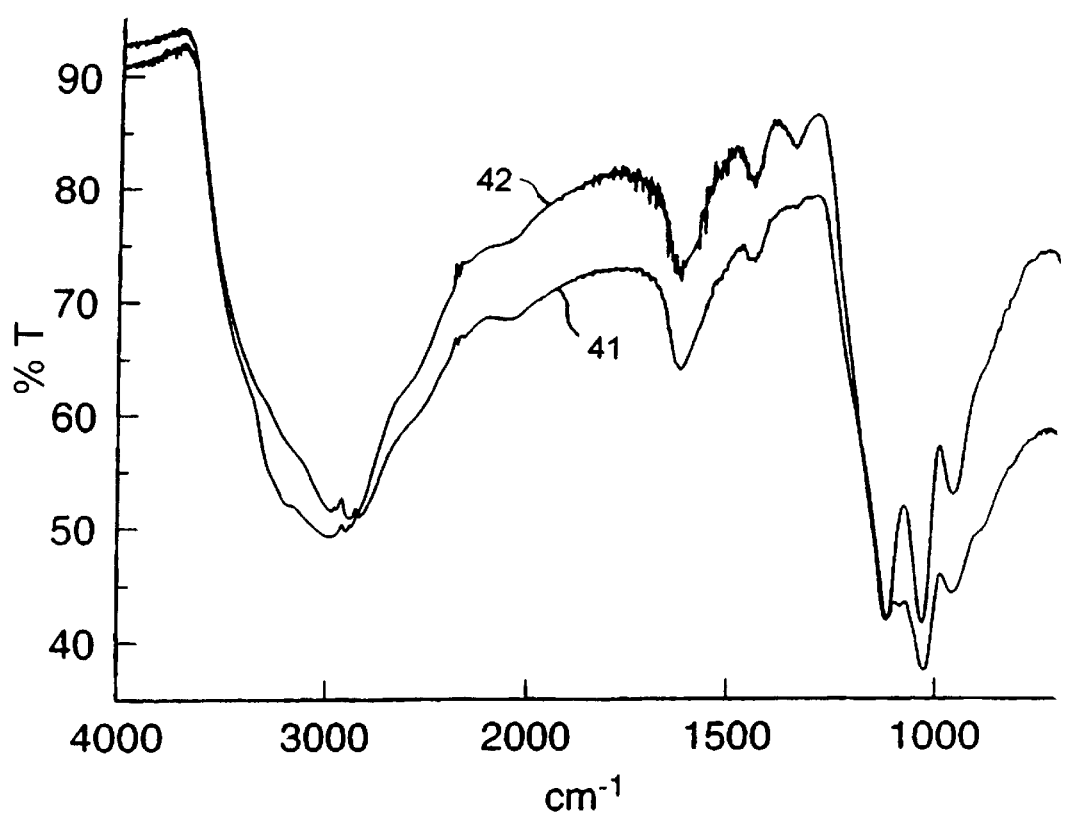
FIG. 4 shows infrared spectra for the materials of FIGS. 1 and 2.
Figure 5:
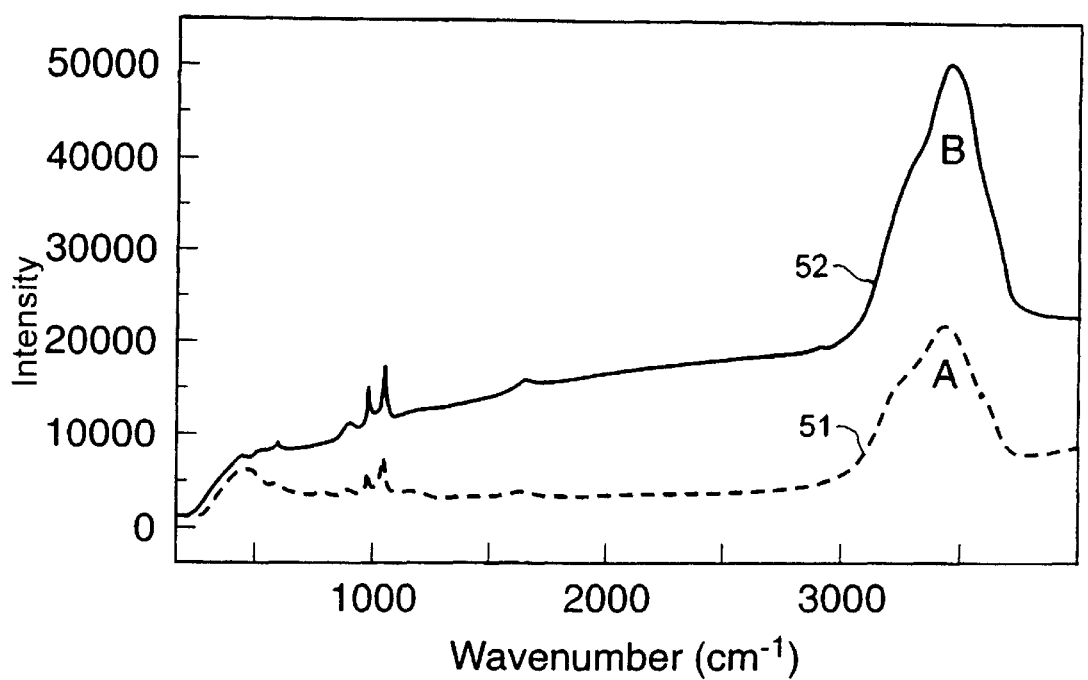
FIG. 5 shows Raman spectra for the materials of FIGS. 1 and 2.

The difference in the sulfate complex produced by following process B, as shown in FIG. 2, was verified by IR spectrum data, Raman spectroscopy, and IR absorption. FIG. 4 gives the IR spectrum for the sulfate produced by Process A, curve 41, and the IR spectrum for the sulfate produced by Process B, curve 42. These curves clearly show materials with different chemical structures. The difference in chemical structure is inferred from the Raman spectra given in FIG. 5. Here the Raman spectrum for the compound of FIG. 1 (Process A) is shown by curve 51, and the Raman spectrum for the compound of FIG. 2 (Process B) is shown by curve 52. These spectra show more waters of coordination for the FIG. 2 (Process B) complex, and show more metal-metal coordination in the FIG. 1 (Process A) complex.

Figure 6:
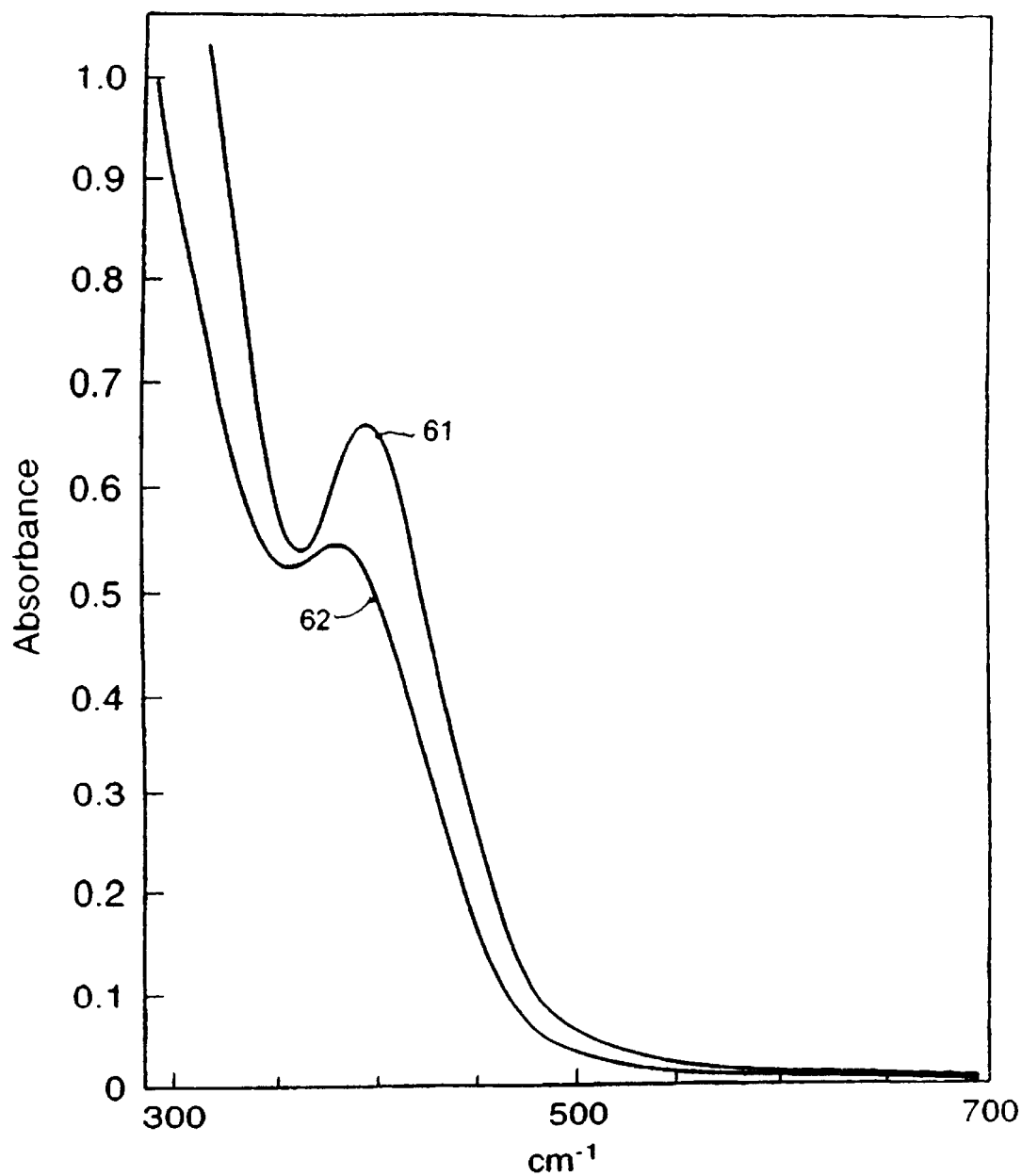
FIG. 6 is a plot of absorbance vs. wavelength for the materials of FIGS. 1 and 2.

The difference between the chemical structures is further evident from a comparison of the IR absorption properties. Data for these is plotted in FIG. 6, where the absorbance for the compound of FIG. 1 (Process A) is shown by curve 61, and the absorbance for the compound of FIG. 2 (Process B) is shown by curve 62.

The following example describes in detail the process of preparing the rhodium sulfate compound and the rhodium sulfate solution of the invention.

EXAMPLE I

Equipment
1. 5 liter round bottom Pyrex flask fitted with condenser and thermometer.
2. Heating mantle for flask.
3. Magnetic stirplate with Teflon magnetic stirrer.
4. 26 liter Pyrex jar.
5. 24 centimeter porcelain Buchner funnel.
6. 4 liter vacuum flask.
7. 4 liter Pyrex beaker.

Procedure:
1. Place item #1 in heating mantle and insert stirbar. Place unit on stirplate.
2. Add 2040 milliliters conc. sulfuric acid to 5 liter flask.
3. Turn on stirrer and carefully add 180 milliliters water.
4. Weigh out 311 grams rhodium black and add to flask.
5. Turn on water to condenser and set power to maximum setting.

6. Heat to boiling (240–260° C.) and boil under reflux for 4 hours.
7. Turn off heating mantle and allow to cool to room temperature.
8. Add 15 liters water to 26 liter glass jar and place jar on stirplate.
9. Place stirbar in jar and stir while carefully adding contents of 5 liter flask to the jar.
10. Cool solution to substantially below room temperature (25° C.) i.e. to approximately 0° C. and slowly add, while stirring, concentrated ammonium hydroxide (approx. 4 liters) until pH is 8.0–8.5.
11. Set up Buchner funnel and vacuum flask and filter yellow precipitate of rhodium hyroxide.
12. Pull dry and wash 3 times with water, pulling dry after each wash.
13. Transfer wet cake to 4 liter beaker.
14. Add conc. sulfuric acid to wet cake. Milliliters sulfuric acid required: 311×97%×0.8.
15. Stir with glass or Teflon rod until all yellow precipitate is dissolved.
16. Filter solution on Buchner funnel.
17. Transfer dark red rhodium sulfate solution to a 4 liter beaker.
18. Stir and sample. Analyze sample for rhodium content (wt %) and density.
19. Calculate quantity of water to bring rhodium concentration to 100 grams per liter:

Volume water required (liters)=(grams rhodium sulfate×% rhodium/100)−(grams rhodium sulfate/density×1000)

Rhodium sulfate solutions prepared in accordance with the invention are stable and suitable for electrolytic deposition of rhodium as described in the following example.

EXAMPLE II

A nickel plate was immersed as cathode in a rhodium sulfate electrolyte prepared in accordance with the procedures described above. Typical bath compositions are:

| Constituent | for 20 $\mu$" range | for 50 $\mu$" range |
|---|---|---|
| Rh as metal | 2 g/l | 8 g/l |
| Sulfuric acid | 50 ml/l | 50 ml/l |
| Rho Tech (brightener) | 150 ml/l | 150 ml/l |

Rhodium was plated onto the nickel cathode using the following parameters:

| | |
|---|---|
| Current Density | 2–10 amperes per square foot |
| Cathode Efficiency | 20–70% |
| Agitation | 5–10 cm/s |
| Bath Temperature | 40–50° C. |
| Bath pH | <1 |
| Plating Rate | 1–7 microinches / min |

Results of plating runs demonstrated that relatively low stress (crack free) bright rhodium plates can be routinely produced over a thickness range of 1–50 $\mu$".

The rhodium sulfate solution that is the product of Process B described above is characterized by a pH of less than 1 and by the presence of rhodium as a rhodium sulfate complex as shown in FIG. 2. This rhodium sulfate complex is essentially devoid of rhodium to rhodium bonding. This solution, typically with a concentration of rhodium in the range 1–10 g/l, is useful as an electrolyte for plating rhodium.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. Method for the manufacture of rhodium sulfate comprising the steps of:
    (a) reacting rhodium metal with sulfuric acid to produce a first rhodium sulfate solution,
    (b) cooling said first rhodium solution to a temperature below 20° C.,
    (c) neutralizing said first rhodium sulfate solution by the addition of a base to precipitate rhodium hydroxide, while maintaining and controlling the rhodium sulfate solution at a temperature below 25° C. and
    (d) combining said rhodium hydroxide with sulfuric acid to produce a second rhodium sulfate solution.

2. The method of claim 1 in which the rhodium sulfate in said second rhodium sulfate solution is essentially devoid of rhodium to rhodium bonding.

3. The method of claim 1 in which the base is ammonium hydroxide.

4. The method of claim 1 in which the first rhodium sulfate solution is cooled to a temperature of approximately 10° C.

5. A method for electroplating rhodium comprising the steps of:
    (a) reacting rhodium metal with sulfuric acid to produce a first rhodium sulfate solution,
    (b) cooling said first rhodium solution to a temperature below 20° C.,
    (c) neutralizing said first rhodium sulfate solution by the addition of a base to precipitate rhodium hydroxide, while maintaining and controlling the rhodium sulfate solution at a temperature below 25° C.,
    (d) combining said rhodium hydroxide with sulfuric acid to produce a second rhodium sulfate solution,
    (e) immersing a cathode and anode in an electrolyte comprising said second rhodium sulfate solution, and
    (f) electroplating rhodium onto said cathode.

6. The method of claim 5 wherein the concentration of rhodium in said second rhodium sulfate solution is in the range 1.0–10 g/l.

7. An electrolyte for electroplating rhodium comprising a solution of rhodium sulfate complex and sulfuric acid, said solution of rhodium sulfate complex and sulfuric acid having a pH of less than 1, and a rhodium concentration in the range of 1–10 g/l, and wherein said rhodium sulfate complex has been neutralized with a base, said neutralization performed while maintaining and controlling the rhodium sulfate complex at a temperature below 25° C. and wherein said rhodium sulfate complex is essentially devoid of rhodium to rhodium bonds.

* * * * *